Figure 1:
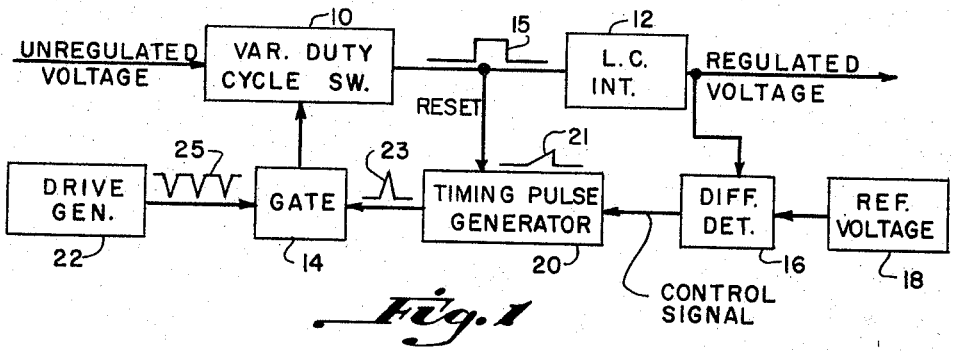

May 30, 1967

R. J. DOSS 3,323,037

VOLTAGE REGULATOR UTILIZING A CONTROLLED VARIABLE
DUTY CYCLE SWITCH
Filed May 4, 1964

INVENTOR
ROBERT J. DOSS

BY
ATTORNEYS.

United States Patent Office 3,323,037
Patented May 30, 1967

3,323,037
VOLTAGE REGULATOR UTILIZING A CONTROLLED VARIABLE DUTY CYCLE SWITCH
Robert J. Doss, Cincinnati, Ohio, assignor to Avco Corporation, Cincinnati, Ohio, a corporation of Delaware
Filed May 4, 1964, Ser. No. 364,441
14 Claims. (Cl. 323—22)

This invention relates to voltage regulators, and more particularly to a system for conditioning a raw voltage to maintain a fixed relation with respect to a reference voltage over allowable load variations. The invention incorporates a novel time pulse generator for regulating a power supply.

In many applications the voltage of battery-operated electronics equipment varies over a wide range, particularly in vehicular applications where the battery is intermittently recharged by a generator which functions during operation of the vehicle. In a typical case, a 24-volt battery may vary in range from 16 to 32 volts and, as will be understood by persons skilled in the art, this variation results in less than optimum operation of electronic equipment. Furthermore, variations in the load can produce wide variations in voltage level of the power supply. This invention provides voltage regulation in a unique, efficient manner irrespective of load demands.

In accordance with the invention, an unregulated voltage is applied through a variable duty cycle switch to provide variable width square waves which are then applied to an integrator. The output from the integrator is a function to the duty cycle and it constitutes the regulated voltage. The regulated voltage is compared with a reference voltage to detect any differences between the regulated voltage and the reference voltage and produce a control current. The invention incorporates means, including a novel servo loop, for varying the duty cycle of the variable duty cycle switch to maintain the proper regulated voltage.

The servo loop includes a drive generator for generating a reference frequency drive which is applied through a normally closed gate to the variable duty cycle switch. The width of the square wave output generated by the variable duty cycle switch depends on the timing of the opening and closing of the gate. A timing pulse generator generates a sawtooth voltage, having a slope dependent on magnitude of the control voltage, and then generates a timing pulse when the sawtooth exceeds the predetermined threshold value. The timing pulse serves to open the gate. The presence of an output from the variable duty cycle switch serves to reset the sawtooth voltage until the end of the duty cycle, whereupon the cycle is continuously repeated.

It is an object of this invention to produce a stabilized and regulated D.C. output voltage from an unregulated power supply.

Another object of this invention is to process an unregulated voltage into a regulated voltage supply which will remain constant irrespective of load variations.

Another object of this invention is to provide a system for timing the operation of a variable duty cycle switch to provide a regulated voltage output.

Another object of this invention is to provide a variable duty cycle switch to which an unregulated voltage is applied and to time the opening and closing of the switch to provide a pulse-type voltage output having an average value which is a function of load demand, the voltage output being compared with a reference voltage, and any error resulting in timed impulses for controlling the switch.

Still another object of this invention is to provide an electronic circuit for generating timing pulses for controlling a variable duty cycle switch.

Figure 2:
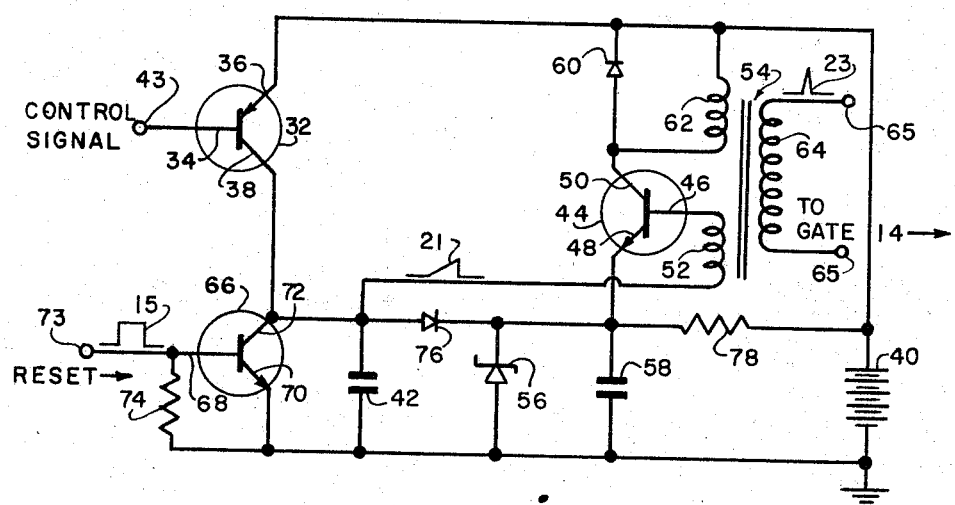

For further objects and a more precise description of the invention, reference should now be made to the following detailed specification and to the accompanying drawings in which:

FIGURE 1 is a block diagram of the complete system;
FIGURE 2 is a schematic representation of the timing pulse generator; and
FIGURE 3 is a series of curves showing the operation of the system.

Figure 3:
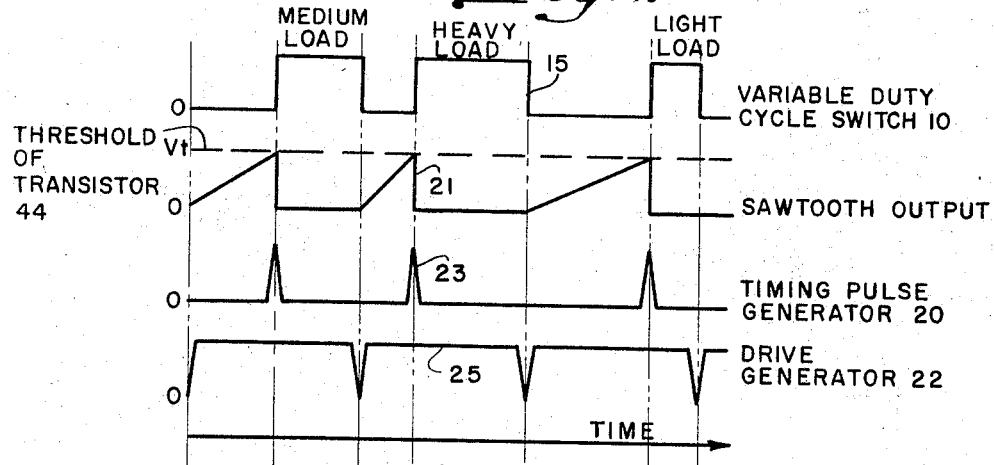

Referring to FIGURES 1 and 3, an unregulated voltage is applied through a variable duty cycle switch 10 to an L-C integrator 12. The output of the integrator 12 constitutes the regulated voltage output. The variable duty cycle switch functions as a single-pole, double-throw switch which, when closed, serves to couple the unregulated voltage to the integrator 12. The switch 10 is opened or closed by the output from a gate 14, and its duty cycle is a function thereof; that is to say, the output of the variable duty cycle switch 10 is a square wave 15 having a width which is a function of the duration of the output from the gate 14. Any variable duty cycle switch known to the art may be used; however, in the system as reduced to practice the switch used was of the type disclosed in the copending application of Doss et al. entitled "Regulated Direct Current Power Supplies," Ser. No. 342,087, filed Feb. 3, 1964, and assigned to the same assignee as this invention, said application being incorporated herein by reference.

The reguIted voltage output from the integrator 12 is compared in a conventional difference detector 16 with the output from a reference voltage source 18. The output from the difference detector 16 is a direct current error voltage having a magnitude and polarity (with respect to an established reference point) proportional to the difference between the regulated voltage and the reference voltage.

The error voltage output from the difference detector 16 is applied to a timing pulse generator 20 (hereinafter to be described in detail) which functions to repeatedly generate sawtooth voltages 21 having a slope dependent on the magnitude of the error signal output from the difference detector 16. When the magnitude of the generated sawtooth voltage 21 exceeds an established threshold, the timing pulse generator serves to generate a timing pulse 23 which in turn serves to open the normally closed gate 14. The drive power for controlling the duty cycle of the switch 10 is supplied through the gate 14 from a drive generator 22 which serves to generate constant frequency, constant width square waves 25 with very short periods of time between each generated wave.

It will be noted that the output square waves 25 from the drive generator 22 are continuously applied to the gate 14. However, the gate 14 is closed until such time as a timing pulse 23 is produced by the generator 20, and the timing pulse 23 is controlled by the slope of the sawtooth voltage 21 produced in the generator 20. The slope of the sawtooth voltage is a function of the magnitude of the error voltage. When the timing pulse 23 is produced, gate 14 is opened and the output from the drive generator 22 serves to maintain the variable duty cycle switch 10 open for the remainder of the duration of the particular square wave 25 then produced by the drive generator 22.

During the period when a square wave 15 appears at the output of the variable duty cycle switch 10, the sawtooth generator within the timing pulse generator 20 is reset into a locked-off state; that is, no sawtooth wave is produced. At the termination of each square wave 15 another sawtooth voltage 21 is produced and the cycle repeats.

The timing pulse generator 20, shown in detail in FIGURE 2, comprises a transistor 32 having a base 34, an emitter 36, and a collector 38, the emitter being connected to a battery 40, or other source of supply, and the collector 38 being connected to ground through a capacitor 42. The error signal output from the difference detector is applied to the base 34 from terminal 43, and the resulting conduction through the transistor serves to charge the capacitor 42. The voltage developed across the capacitor 42 constitutes the sawtooth voltage 21.

The timing pulse generator 20 also includes a transistor 44 having a base 46, an emitter 48, and a collector 50, the base 46 being coupled to the capacitor 42 through a winding 52 of a transformer 54. The emitter 48 is connected to ground through a parallel connected zener diode 56 and capacitor 58, and the collector 50 is connected to the battery 40 through a parallel connected diode 60 and primary winding 62 of transformer 54. The transistor 44, in conjunction with its associated circuitry, is a blocking oscillator, the output voltage of which is applied through the secondary winding 64 of transformer 54 to terminals 65. The output at terminals 65 constitutes the timing pulses 23 which are applied to the gate 14 to control the variable duty cycle switch 10.

The timing pulse generator 20 also includes a transistor 66 having a base 68, an emitter 70, and a collector 72. The square wave 15 from the variable duty cycle switch provides the reset signal for the timing pulse generator and is applied at terminal 73 to resistor 74 connected across the emitter-base junction of transistor 66. The collector 72 and emitter 70 are connected across the capacitor 42. Upon the occurrence of a square wave 15 from the switch 10, the transistor 66 is rendered conductive, and capacitor 42, previously charged by conduction of transistor 32, discharges through the emitter-collector junction of transistor 66, and hence prevents the further generation of sawtooth voltage 21.

In the event of a system failure resulting from the absence of a square wave 15 (the reset signal for sawtooth voltage 21), the system includes a clamping diode 76 connected between the collector 72 of transistor 66 and the zener diode 56. Thus, in the event that the voltage charge on capacitor 42 exceeds a predetermined limit established by the back bias provided on the diode 76 from the battery 40 through a dropping resistor 78, the diode 76 conducts through the zener diode 56 short-circuiting the capacitor 42 for the excessive currents and preventing the application of such currents to the base 46 of transistor 44.

In the operation of the system an unregulated voltage applied to the variable duty cycle switch 10 appears as a square wave 15 having a width dependent upon the period of time the switch 10 is closed. The closing and opening of the switch 10 is controlled by the output pulses 23 of the timing pulse generator 20 in combination with the output voltage 25 of the drive generator 22, both of which voltages are applied to the gate 14. The application of the timing pulse 23 to the gate 14 opens the gate, permitting the square wave 25 from drive generator 22 to close the variable duty cycle switch 10 which remains closed until the end of the particular square wave 15 driving it, whereupon it opens. The variable duty cycle switch 10 remains closed until the gate 14 is again reopened by the next timing pulse 23 from the timing pulse generator 20.

As previously noted, a control signal proportional to the difference between the regulated voltage and the reference voltage is developed at the output of the difference detector 16. The control signal is applied at terminal 43 to the base 34 of transistor 32, permitting currents of a magnitude proportional to the control signal to flow through the emitter-collector junction into capacitor 42. To follow a complete cycle, assume that a reset square wave 15 from the variable duty cycle switch 10 is applied to the terminal 73 of the timing pulse generator 20 such that significant collector-emitter current is flowing through the transistor 66. Under these conditions, current from the battery will flow through the transistors 32 and 66 and the capacitor 42 will not be charged. Now when the reset square wave 15 is removed, that is when the variable duty cycle switch 10 is open, transistor 66 stops conducting, permitting a voltage to build up across the capacitor 42. The capacitor 42 will charge at a rate which varies in direct relation to the magnitude of the control signal. The sawtooth voltage 21 developed across the capacitor 42 is applied directly to the base of transistor 44 through the primary winding 52 of pulse transformer 54.

In the meantime the capacitor 58 has been charged by the battery 40 to a voltage compatible with the zener diode 56 which is operated in its zener breakdown region to fix the voltage elevation of the emitter 48 of transistor 44 and to establish the threshold level of the transistor 44. When the sawtooth voltage 21 across capacitor 42 exceeds the established threshold $V_t$, the transistor 44 conducts and tends to deliver output pulses 23 in a manner common to blocking oscillators. However, the next square wave 15, occurring immediately after the generation of the first timing pulse 23, again causes transistor 66 to conduct, resulting in the discharging of capacitor 42 through the emitter-collector junction. Thus, a single output pulse 23 is generated during each timing cycle.

As seen in FIGURE 3, each square wave 15 serves to reset the sawtooth generator to zero until its termination, whereupon the generation of a subsequent sawtooth voltage is permitted. Because the charging rate of capacitor 42 is dependent on the magnitude of the control signal, the time of generation of the timing pulses 23 is a function of control signal magnitude. That is, transistor 32 acts as an impedance varying with the signal controlling the charging rate on capacitor 42 between the reset actions, while the collector-emitter impedance of transistor 44 is switched between two fairly fixed values varying between cutoff and saturated state conditions.

The system has utility as a D.C. level comparator, a voltage level regulator, and reference voltage follower. It appears particularly applicable in D.C. amplifying systems converting the D.C. voltage level information to pulse-rate-type information with a high degree of linearity.

Thus there has been provided a system which processes an unregulated voltage into a regulated voltage which will remain constant irrespective of load variations. The unregulated voltage is admitted to the variable duty cycle switch 10 where it is transformed to a different voltage level and power rate compatible with the instantaneous load demand. This transversion is controlled by timing of the power drive.

In order to enable persons skilled in the art to more readily produce this invention, the following exemplary parameters may be used:

Transistors:
 32 _____ Type 115P2
 44 _____ Type 115N2
 66 _____ Type 115N2

Diodes:
 56 _____ Type 1N751A
 60 _____ Type AM620A
 76 _____ Type AM620A

Resistors:
 74 _____ohms__ 3.3K
 78 _____do____ 10K

Capacitors:
 42 _____pf__ 680
 58 _____µf__ .5
Battery 40 _____volts__ 10

Many modifications and adaptations of this invention will be readily apparent to persons skilled in the art. For example, depending on the particular application, vacuum tubes may be substituted for transistors and the threshold of transistor 44 may be varied by means other than the zener diode 56. It is intended, therefore, that this invention be limited only by the appended claims as interpreted in in the light of the prior art.

What is claimed is:

1. A voltage regulating system including:
  a source of unregulated direct voltage;
  a normally open switch;
  an integrator coupled to said source through said switch for producing an output voltage;
  means for generating a control signal proportional to the difference between said output voltage and a predetermined voltage;
  means responsive to said control signal for closing said switch for periods of time inversely proportional to the magnitude of said control signal, said last-named means comprising a drive generator for repeatedly generating square waves at a fixed rate, said square waves being coupled to said switch through said gate, said square waves serving to close said switch, and a timing pulse generator for generating a pulse for opening said gate during the periods of each of said square wave at times determined by the magnitude of said control signal; and
  said timing pulse generator comprising means responsive to said control signal for generating a sawtooth voltage, the slope of said sawtooth voltage being proportional to the magnitude of said control signal, means responsive to said sawtooth voltage when said sawtooth voltage exceeds a predetermined threshold for generating a pulse, said pulse being applied to said gate for opening said gate, and means responsive to the closing of said switch for resetting said sawtooth voltage until said switch is re-opened, whereupon the cycle repeats.

2. The invention as defined in claim 1 wherein said sawtooth generator comprises a transistor having base, emitter, and collector electrodes and a capacitor connected in series with said collector and emitter electrodes across a source of biasing potential, said control signal being applied to said base electrode, and said sawtooth voltage being derived from across said capacitor.

3. The invention as defined in claim 2 wherein said means for resetting said sawtooth voltage comprises a second transistor having base, emitter, and collector electrodes, said collector and emitter electrodes being connected across said capacitor, the output from said switch being coupled to said base electrode, said transistor being rendered conductive by the output from said switch when said switch is closed and providing a discharge path for said capacitor.

4. The invention as defined in claim 3 wherein said means for producing a timing pulse comprises a blocking oscillator, said sawtooth voltage being applied to said blocking oscillator, said blocking oscillator being biased off when said sawtooth voltage is below said threshold, and being operative when said sawtooth exceeds said threshold.

5. The invention as defined in claim 4 wherein said blocking oscillator comprises a third transistor having base, emitter, and collector electrodes;
  a transformer having a first primary winding coupling said sawtooth voltage to said base electrode;
  a zener diode connected to said emitter electrode;
  a second primary winding connected to said collector electrode, said source of biasing potential being connected across said second primary, said collector and emitter electrodes, and said zener diode, said zener diode establishing said threshold level; and
  a secondary winding connected to said gate, the output pulse developed across said secondary winding serving to open said gate.

6. The invention as defined in claim 5, and protective means in the absence of an output voltage for disabling said blocking oscillator.

7. The invention as defined in claim 6 wherein said protective means includes a semiconductor diode connected in series with said zener diode across said capacitor, said semiconductor diode being back-biased by the voltage across said zener diode until the voltage across said capacitor exceeds the voltage across said zener diode, whereupon said capacitor discharges through said semiconductor diode and said zener diode.

8. In a system for regulating the duty cycle of a switch, the combination comprising:
  a source of control signal having a magnitude proportional to said duty cycle;
  a normally closed gate;
  a drive generator for repeatedly generating square waves at a fixed rate, said square waves being coupled to said switch through said gate, said square waves serving to close said switch; and
  a timing pulse generator responsive to said control signal for opening said gate during the periods of each of said square waves at times determined by the magnitude of said control signal, said timing pulse generator comprising:
  means responsive to said control signal for generating a sawtooth voltage, the slope of said sawtooth voltage being proportional to the magnitude of said control signal;
  means responsive to said sawtooth voltage when said sawtooth voltage exceeds a predetermined threshold for generating a pulse, said pulse being applied to said gate for opening said gate; and
  means responsive to the closing of said switch for resetting said sawtooth voltage until said switch is re-opened, whereupon the cycle repeats.

9. The invention as defined in claim 8 wherein said sawtooth generator comprises a transistor having base, emitter, and collector electrodes and a capacitor connected in series with said collector and emitter electrodes across the source of biasing potential, said control signal being applied to said base electrode and said sawtooth voltage being derived from across said capacitor.

10. The invention as defined in claim 9 wherein said means for resetting said sawtooth voltage comprises a second transistor having base, emitter, and collector electrodes, said collector and emitter electrodes being connected across said capacitor, the output from said switch being coupled to said base electrode, said transistor being rendered conductive by the output from said switch when said switch is closed and providing a discharge path for said capacitor.

11. The invention as defined in claim 10 wherein said means for producing the timing pulse comprises a blocking oscillator, said sawtooth voltage being applied to said blocking oscillator, said blocking oscillator being biased off when said sawtooth voltage is below said threshold, and being operative when said sawtooth exceeds said threshold.

12. The invention as defined in claim 11 wherein said blocking oscillator comprises a third transistor having base, emitter, and collector electrodes;
  a transformer having a first primary winding coupling said sawtooth voltage to said base electrode;
  a zener diode connected to said emitter electrode;
  a second primary winding connected to said collector electrode, said source of biasing potential being connected across said second primary, said collector and emitter electrodes, and said zener diode, said zener diode establishing said threshold level; and
  a secondary winding connected to said gate, the output pulse developed across said secondary winding serving to open said gate.

13. The invention as defined in claim 12, and protective means in the absence of an output voltage for disabling said blocking oscillator.

14. The invention as defined in claim 13 wherein said protective means includes a semiconductor diode connected in series with said zener diode across said capacitor, said semiconductor diode being back-biased by the voltage across said zener diode until the voltage across said capacitor exceeds the voltage across said zener diode, whereupon said capacitor discharges through said semiconductor diode and said zener diode.

References Cited

UNITED STATES PATENTS

| | | | |
|---|---|---|---|
| 3,040,239 | 6/1962 | Walker | 323—24 |
| 3,223,915 | 12/1965 | Ryerson | 321—18 |
| 3,262,046 | 7/1966 | Clarke | 321—18 |
| 3,263,157 | 7/1966 | Klein | 323—22 |

JOHN F. COUCH, *Primary Examiner.*

K. D. MOORE, G. GOLDBERG, *Assistant Examiners.*